United States Patent Office 3,404,982
Patented Oct. 8, 1968

3,404,982
PHOTOGRAPHIC MATERIALS FOR THE SILVER DYESTUFF BLEACHING PROCESS
Walter Anderau, Aesch, Basel-Land, and Hansrolf Loeffel, Neu-Allschwil, Switzerland, assignors to Ciba Limited, Basel, Switzerland, a Swiss company
No Drawing. Filed May 18, 1965, Ser. No. 456,829
Claims priority, application Switzerland, June 2, 1964, 7,195/64
7 Claims. (Cl. 96—99)

ABSTRACT OF THE DISCLOSURE

The present invention provides photographic materials for the silver dyestuff bleaching process that contain in one layer silver halide and at least a copper complex of an azo dyestuff containing a radical of a dibasic carbon-containing acid. These dyestuffs generally display a very pure cyan tint in gelatine, are fast to light and diffusion and yield pure whites in areas where they have been completely reduced.

---

The present invention provides photographic materials for the silver dyestuff bleaching process that have specially valuable properties and contain in one layer at least one dyestuff which, like the dyestuff of the formula (1)

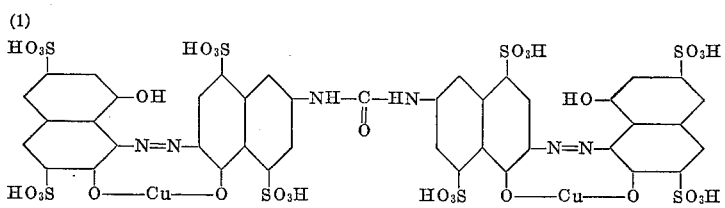

corresponds to the general formula (2)  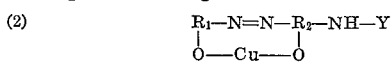

in which $R_1$ represents a naphthalene radical containing a hydroxyl group in 8-position and at least one sulfonic acid group and which is bound to the azo group in 1-position and to the —O—Cu— group in 2-position, $R_2$ represents a naphthalene radical containing at least one sulfonic acid group and which is bound to the azo group in 2-position and to the —Cu—O— group in 1-position and A represents a higher-molecular acyl radical.

The dyestuffs of the Formula 2, of which a few are known, can be obtained, for example, by treating dyestuffs of the formula (3)  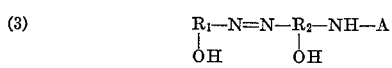

in which $R_1$, $R_2$ and A have the meanings given above, with agents capable of yielding copper. Corresponding dyestuffs that contain a hydrogen atom in place of one of the two hydroxyl groups can also be converted into the complex copper compounds when metallization is carried out in the presence of an oxidizing agent.

Dyestuff of the Formula 2 which have proved to be valuable are mainly those of the formula (4) 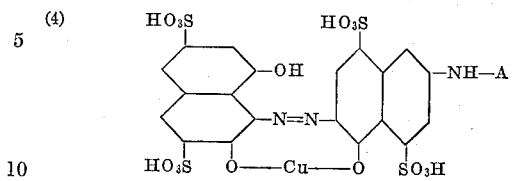

in which A has the meaning given above. A may be an acyl radical that prevents diffusion of the dyestuff in the gelatine layer, for example, the acyl radical of a higher fatty acid having 12 to 18 carbon atoms, for example, a lauroyl or stearoyl radical. A can also represent a corresponding urethane radical instead of a simple acyl residue. Dyestuffs of the kind defined can be prepared by reacting the corresponding copper-containing compounds, which contain a free amino group instead of the —NH—A group, with halides of the fatty acids or the chloroformic acid esters of higher alcohols. Other acyl radicals, which are obtainable with the aid of cyanuric chloride, contain a triazine ring that may be further substituted by an aminobenzene radical.

However, layer dyestuffs that are specially valuable are those of the formula (5)  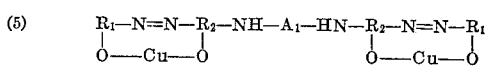

in which $R_1$ and $R_2$ have the meanings given above and $A_1$ represents the radical of a dibasic carbon-containing acid, preference being given to dyestuffs of the formula (6)

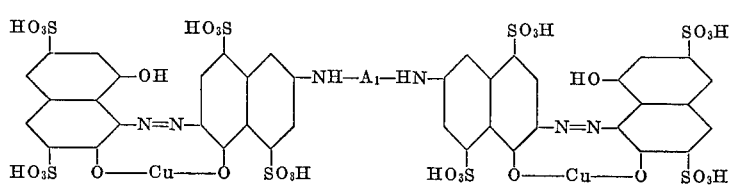

These can be prepared by coupling diazotized 1-amino-8-benzenesulfonyloxynaphthalene-3:6-disulfonic acid in an alkaline medium with 2-acetylamino-5-hydroxynaphthalene-4:8-disulfonic acid, converting the dyestuff into the ortho:ortho′-dihydroxyazo copper complex by coppering under oxidizing conditions, hydrolyzing the acetylamino group and then linking together two molecular parts of the aminoazo dyestuff by means of appropriate derivatives of dibasic acids, preferably acid chlorides.

Another mode of preparation consists in coupling diazotized 2-nitro-6-aminonaphthalene-4:8-disulfonic acid with the benzenesulfonyl ester of 2-amino-8-hydroxynaphtalene-3:6-disulphonic acid at a pH value of 5, converting the amino group in ortho-position of the azo bridge into a hydroxyl group by treatment with nitrous acid at room temperature, coppering under oxidizing conditions and reducing the nitro group with sodium sulfide. The ester is split during reduction and 2:8:1'-trihydroxy-6'-amino-1:2'-azonaphthalene-3:6:4':8'-tetrasulfonic acid which may be partially decoppered is obtained. It is converted into the acylamino compound by linkage at the amino group and then coppered.

Linkage may be effected with the dihalides of the following acids:

Adipic acid, fumaric acid, butadine dicarboxylic acid, isophthalic acid, terephthalic acid, diphenyl-(1:1')-urea-4:4'-dicarboxylic acid, pyridine-2:4-, 2:5-, 2:6- or 3:5-dicarboxylic acid, pyrrole-2:5-dicarboxylic acid, furane-2:5-dicarboxylic acid and thiophene-2:5-dicarboxylic acid.

Urea derivatives that have been found to be specially valuable are those obtained from the aminoazo dyestuff of the kind defined and also those obtained from the aminoazo dyestuffs of the general formula (7) 

in which $R_1$ and $R_2$ have the meanings given above, by reaction with phosgene, i.e. the dichloride of carbonic acid.

The dyestuffs of the Formulae 1, 2, 5 and 6 can be prepared in the customary manner, including, in particular, the process of linkage at the amino groups by means of dicarboxylic acid dihalides or phosgene.

Further dyestuffs are obtainable by nitrobenzoylating 2:8:1'-trihydroxy-6'-amino-1:2'-azonaphthalene - 3:6:4': 8'-tetrasulfonic acid and reducing it to the amine of the Formula 8 which, in turn, can be linked by means of phosgene or the dicarboxylic acid dihalides already mentioned.

(8) 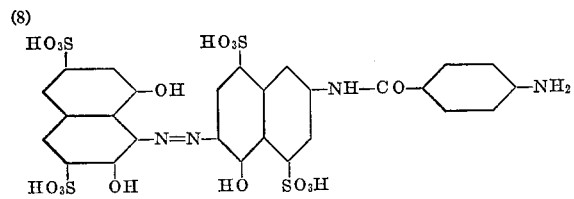

Like the dyestuffs, the photographic layers which in accordance with the invention contain at least one dyestuff of the Formula 2, can be prepared in known manner and used for the production of colored images.

The dyestuffs of the Formula 2 generally display a cyan tint in gelatine and, in multilayer material on a support, they are advantageously present in the lowest red-sensitized silver halide-gelatine emulsion layer, which material also contains a magenta-colored, green-sensitized emulsion layer and a yellow-colored emulsion layer that is not specially sensitized.

The dyestuffs of the Formula 2 have been found to be eminently suitable for use as layer dyestuffs for the silver dyestuff bleaching process. For example, their main range of absorption, measured in gelatine, is between 610 and 670 mμ and they display only slight subsidiary absorption at 400 to 450 mμ. Thus, gelatine layers colored with these fast to light dyestuffs have very pure cyan tints. As a rule, the dyestuffs are rendered non-diffusing by the higher-molecular acyl radical A, especially when the said radical is a second monoazo dyestuff radical, as in the case of the dyestuffs of the Formulae 1, 5 and 6, but they are nevertheless sufficiently water-soluble. In cases where resistance to diffusion does not meet requirements, it can be improved by use of one of the customary precipitants, for example, a diphenylguanide, without impairing the fastness to light. This is particularly good in the case of the dyestuffs to be used in accordance with the invention. The complex-forming copper is so firmly bound in these dyestuffs that it cannot damage the silver halide emulsion and thus does not give rise to fogging. The surprising observation has also been made that the copper remains almost completely bound in the complex in the strongly acid baths normally used in dyestuff bleaching and for the oxidation of unconsumed silver with copper sulfate. Furthermore, the dyestuffs have the advantage that they can be satisfactorily bleached in the silver dyestuff bleaching process and yield pure whites at areas where they have been completely reduced.

The following example illustrates the invention.

Unless otherwise stated, the parts and percentages in the following manufacturing processes and example are by weight.

Manufacturing processes (A) 52.6 parts of 2-nitro-6-aminonaphthalene-4:8-disulfonic acid, obtained by acetylation of 6-amino-naphthalene-4:8-disulfonic acid, nitration and subsequent hydrolysis of the acetyl group with dilute hydrochloric acid are dissolved at 60 to 70° C. in 600 parts of water and 10 parts of sodium hydroxide solution. 25 parts by volume of 4 N sodium nitrite solution are added at 30° C. and the 2-nitro-6-aminonaphthalene-4:8-disulfonic acid precipitated on further cooling. 40 parts of concentrated hydrochloric acid are added at 0° C., a pale fawn emulsion being instantly formed. Excess nitrite is destroyed with sulfamic acid after stirring vigorously for 30 minutes.

48.6 parts of the 2-amino-8-hydroxynaphthalene-3:6-disulfonic acid esterified with benzenesulfonic acid chloride are dissolved in 400 parts of water after the addition of concentrated aqueous sodium hydroxide solution with slight heating and the solution renders weakly acid with acetic acid. A small amount of coupling component precipitates when the solution is cooled to 0° C.

The coupling component is quickly added to the diazo component and coupling begins after buffering with 100 parts of 7 N potassium acetate solution. After one hour, a further 100 parts of potassium acetate solution are added and the batch slowly allowed to attain room temperature. Coupling is practically finished after 2½ hours. The batch is stirred overnight, heated to 40° C., 100 parts of potassium acetate are added, the batch is cooled, filtered and the residue washed with alcohol. For purification, the presscake is dissolved in 1300 parts of water and 80 parts of potassium acetate solution added at 50° C. After cooling, filtering and washing with alcohol about 74.2 parts of coupling product are obtained.

In order to convert the amino group in ortho-position to the azo bridge into a hydroxyl group, 16.4 parts of the coupling product obtained in the manner described above are dissolved in 250 parts of warm water and 10 parts of concentrated sodium hydroxide solution added; the pH value is 13. The batch is cooled to 0° C., 5 parts by volume of 4 N sodium nitrite solution and 20 parts of cooled concentrated sulfuric acid are added, the temperature being kept as low as possible with ice; evolution of gas begins immediately. The ice is allowed to melt while stirring and a red powder precipitates overnight; the powder is isolated by suction filtration and dried. The yield is about 15 parts.

For the oxidative coppering 8.2 parts of the red powder so obtained are dissolved in 200 parts of water at 50° C. and since the product has previously been precipitated under acid conditions, the pH value is first adjusted to 5 with sodium hydroxide solution and then to 6 with 10 parts of 7 N potassium acetate solution.

A solution of 3.1 parts of copper sulfate pentahydrate in a small amount of water (corresponding to an excess of 25%) is added to the solution so obtained. The solution turns blue when 28 parts of a 3% hydrogen peroxide solution (250%) are added dropwise at 50° C. in the course of 3 hours. A thin-layer chromatogram indicates that the reaction is finished before the total amount of hydrogen peroxide has been added. The batch is stirred overnight, during which process no precipitation takes place, 40 parts of potassium acetate are added, the batch is filtered, the filter residue washed with alcohol and then dried. The yield is about 5 parts of a blue-violet powder.

For reduction of the nitro group 4.7 parts of the blue-violet powder are dissolved in 100 parts of water at 60° C. and 150 parts of 0.1 N sodium sulfide were added dropwise at 60° C. in the course of 3 hours. After stirring for 2 hours the batch is cooled, 60 parts of a 7 N potassium acetate solution are added, the batch is suction-filtered and the filter residue dried. The yield is about 1.9 parts of a dark blue powder consisting of 2:8:1'-trihydroxy-6'-amino-1:2'-azonaphthalene - 3:6:4':8' - tetrasulfonic acid. Analysis indicates that the ester of the coupling component is completely hydrolysed and polarographic measurements indicate less than 50% of the calculated amount of copper.

7.3 parts of 2:8:1'-trihydroxy-6'-amino-1:2'-azonaphthalene-3:6:4':8'-tetrasulfonic acid are dissolved in 100 parts of water and the pH value adjusted to 10 with sodium hydroxide solution. The batch is heated to 45 to 50° C. and phosgene gradually introduced until the pH value drops to 6. Then 5 parts of sodium tetraborate are added, the pH value again adjusted to 10 with sodium hydroxide and more phosgene introduced. This process is repeated three times without the addition of sodium tetraborate.

10 parts of 7 N potassium acetate solution are then added, the batch is allowed to cool and then filtered. For purification, the residue is dissolved in 150 parts of water at 60° C., precipitated with 10 parts of potassium acetate, cooled, isolated by filtration and washed with alcohol. The yield is 2.6 parts of a dull blue dyestuff, which contains practically no copper, 1.7 parts of the dyestuff so obtained are dissolved in 100 parts of water and allowed to react with 5 parts of 0.5 N copper tetrammine solution for one hour at 60° C. The dyestuff crystallizes out as the batch cools; it is then isolated by filtration and dried. The yield is about 1.3 parts of a blue dyestuff of the Formula 1.

(B) 4 parts of sodium tetraborate are added to a solution of 7.3 parts of 2:8:1'-trihydroxy-6'-amino-1:2'-azonaphthalene-3:6:4':8'-tetrasulfonic acid in 250 parts of water; the pH value is 9.3. A solution of 1 part of terephthalic acid dichloride in 50 parts of warm acetone is added all at once and the batch allowed to react overnight at room temperature. The pH value remains at 9 and the dyestuff does not precipitate. 10 parts of a 7 N potassium acetate solution are added, the batch heated to 60° C., allowed to cool and then filtered. The yield is about 2.6 parts. 2.4 parts of the product are dissolved in 50 parts of water at 60° C. and 10 parts of 0.5 N copper tetrammine solution added. The temperature is kept at 60° C. for one hour, potassium acetate solution is added until the dyestuff precipitates, the batch allowed to cool and then the dyestuff is isolated by filtration. The yield is about 1.6 parts.

The preparation of dyestuffs proceeds in an analogous manner when using (C) isophthalic acid dichloride,
(D) pyridine-2:6-dicarboxylic acid dichloride,
(E) fumaric acid dichloride,
(F) thiophene-2:5-dicarboxylic acid dichloride, or
(G) adipic acid dichloride instead of terephthalic acid dichloride.

(H) 20 parts of 2:8:1'-trihydroxy-6'-amino-1:2'-azonaphthalene-3:6:4':8'-tetrasulphonic acid are dissolved in 500 parts of water after the addition of 4 parts of sodium tetraborate with slight heating. A warm solution of 4.6 parts of nitrobenzoyl chloride in 50 parts of acetone is then added, the pH value adjusted to 9 with sodium carbonate solution and the batch allowed to crystallize overnight at room temperature. It is heated to 80° C., cooled, and the crystals filtered. Half of the solid residue is dissolved in 100 parts of water at 50° C. A solution of 1.4 parts of sodium sulfide in warm water is added and the batch allowed to react for one hour at 50° C. It is then left to cool, whereupon the batch is filtered and the filter residue dried. The yield is about 4.5 parts of the product of the Formula 8.

10 parts of the above product are dissolved in 200 parts of water. The pH value is adjusted to 10 with sodium hydroxide and the solution heated to 45 to 50° C. 5 parts of sodium tetraborate are added, the pH value again adjusted to 10 with sodium hydroxide and phosgene is introduced. The whole process is then repeated three times without the addition of sodium tetraborate.

20 parts of a 0.5 N copper tetrammine solution are then added and the batch allowed to react for one hour at 50° C. The dyestuff that precipitates as the batch cools is isolated by filtration, washed with alcohol and dried. The yield is about 2.5 parts.

The preparation of dyestuffs proceeds in an analogous manner when using (I) pyridine-2:6-dicarboxylic acid dichloride,
(K) terephthalic acid dichloride or
(L) thiophene-2:5-dicarboxylic acid dichloride instead of phosgene.

The wavelengths of the absorption maxima of dyestuffs (A) to (L) are listed in the following table.

| Manufacturing process | Linkage | Absorption maxima measured in gelatine, mμ |
|---|---|---|
| A | —CO— | 610 and 656 |
| B | 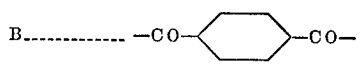 | 610 and 656 |
| C | 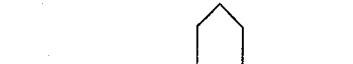 | 614 and 654 |
| D | 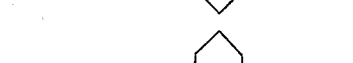 | 616 and 660 |
| E | —CO—CH=CH—CO— | 616 and 660 |
| F |  | 614 and 658 |
| G | 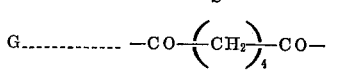 | 610 and 655 |

| Manufacturing process | Linkage | Absorption maxima measured in gelatine, mμ |
|---|---|---|
| H | —OC—⟨⟩—NH—CO—HN—⟨⟩—CO— | 620 and 660 |
| I | —OC—⟨⟩—NH—CO—⟨N⟩—CO—HN—⟨⟩—CO— | 615 and 655 |
| K | —OC—⟨⟩—NH—CO—⟨⟩—CO—HN—⟨⟩—CO— | 617 and 665 |
| L | —OC—⟨⟩—NH—CO—⟨S⟩—CO—HN—⟨⟩—CO— | 620 and 670 |

Example 1

1 part of the dyestuff of the Formula 1, as free from salt as possible, is dissolved in 10 parts of water.

33 milliliters of a silver bromide/gelatine emulsion of medium sensitivity and that can be sensitized to red are admixed at 40° C. with 33 ml. of 4% gelatine and 15 ml. of the dyestuff solution and the whole bulked with water to 100 ml. A surface-active substance, for example, saponin, and/or a hardening agent can be added to the water.

10 milliliters of this mixture are cast on a substrated glass plate measuring 13 cm. x 18 cm., dried, and then exposed under a positive master. Processing is then continued as follows:

(1) Developing for 6 minutes in a bath containing per liter of water, 50 grams of anhydrous sodium sulfite, 0.2 gram of 1-phenyl-3-pyrazolidone, 6 grams of hydroquinone, 35 grams of anhydrous sodium carbonate, 4 grams of potassium bromide and 0.3 gram of bentrizole;

(2) Washing with water for 5 minutes;

(3) Fixing for 6 minutes in a solution of 200 grams of sodium thiosulfate crystals and 20 grams of potassium metabisulfite in 1 liter of water;

(4) Washing with water for 5 minutes;

(5) Bleaching for 3 to 12 minutes with a solution containing per liter of water, 50 to 80 grams of potassium bromide, 40 to 80 grams of thiourea, 35 to 80 grams of 30% sulfuric acid and, if desired, 0.001 gram of 2-amino-3-hydroxyphenazine;

(6) Washing with water for 10 minutes;

(7) Residual silver bleaching for 5 minutes with a solution containing 60 grams of copper sulfate crystals, 80 grams of potassium bromide and 15 ml. of 30% hydrochloric acid per liter of water;

(8) Washing with water for 5 minutes;

(9) Fixing for 5 minutes in the manner described under 3;

(10) Washing with water for 5 minutes.

After drying, a positive blue image is obtained which is completely colorless at the areas of greatest exposure and which displays a pure blue at areas where no light has impinged on the plate.

A layer of the kind described can form part of three-color photographic material together with a green-sensitized magenta layer and a yellow layer of conventional composition.

Instead of the dyestuff of the Formula 1, any of the dyestuffs obtainable by the manufacturing processes B to L can be incorporated in a gelatine layer in the manner described above and used in the production of a colored image.

What is claimed is:

1. Photographic material for the silver dyestuff bleaching process, which comprises a layer containing silver halide and at least one dyestuff of the formula

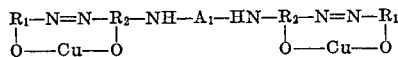

in which $R_1$ represents a naphthalene radical containing a hydroxyl group in 8-position and at least one sulfonic acid group and which is bound to the azo group in 1-position and to the —O—Cu— group in 2-position, $R_2$ represents a naphthalene radical containing at least one sulfonic acid group and which is bound to the azo group in 2-position and to the —Cu—O— group in 1-position and $A_1$ represents the radical of a dibasic carbon-containing acid.

2. Photographic material for the silver dyestuff bleaching process, which comprises a layer containing silver halide and at least one dyestuff of the formula

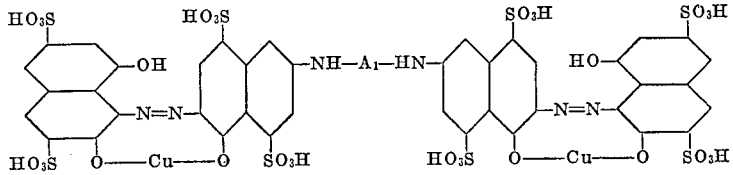

in which $A_1$ represents the radical of a dibasic carbon-containing acid.

3. Photographic material for the silver dyestuff bleaching process, which comprises a layer containing silver halide and the dyestuff of the formula

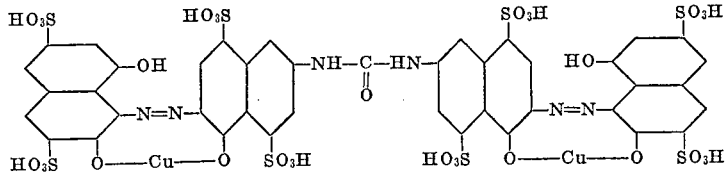

4. Photographic material for the silver dyestuff bleaching process, which comprises a layer containing silver halide and the dyestuff of the formula

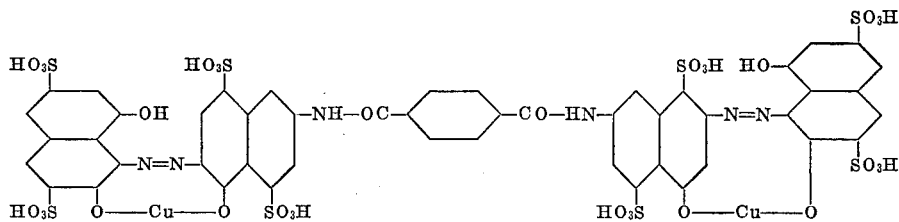

5. Photographic material for the silver dyestuff bleaching process, which comprises a layer containing silver halide and the dyestuff of the formula

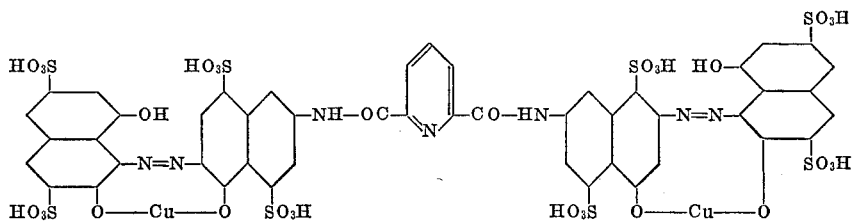

6. Photographic material for the silver dyestuff bleaching process, which comprises a layer containing silver halide and the dyestuff of the formula

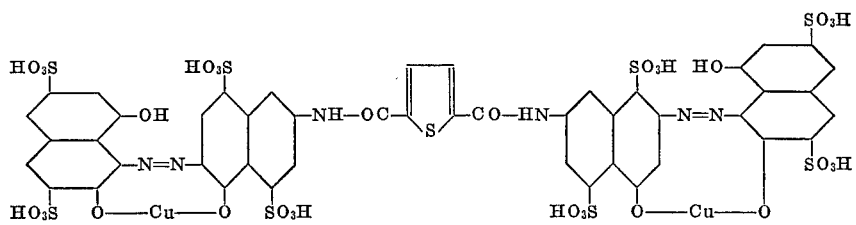

7. Photographic material for the silver dyestuff bleaching process, which comprises a layer containing silver halide and the dyestuff of the formula

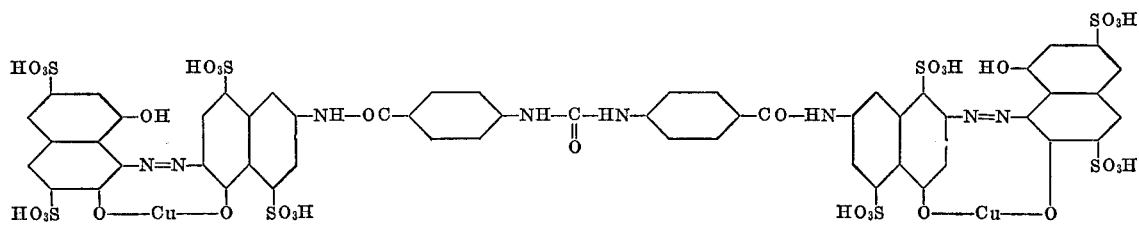

References Cited
UNITED STATES PATENTS

| | | | |
|---|---|---|---|
| 3,178,290 | 4/1965 | Anderan | 96—99 |
| 3,202,511 | 8/1965 | Mory et al. | 96—99 |
| 3,211,556 | 10/1965 | Anderan | 96—99 |

J. TRAVIS BROWN, *Primary Examiner.*